April 26, 1949.  E. LISOTA  2,468,502
ACTUATING DEVICE FOR SLIDING VEHICLE BEDS
Filed July 25, 1947  2 Sheets-Sheet 1
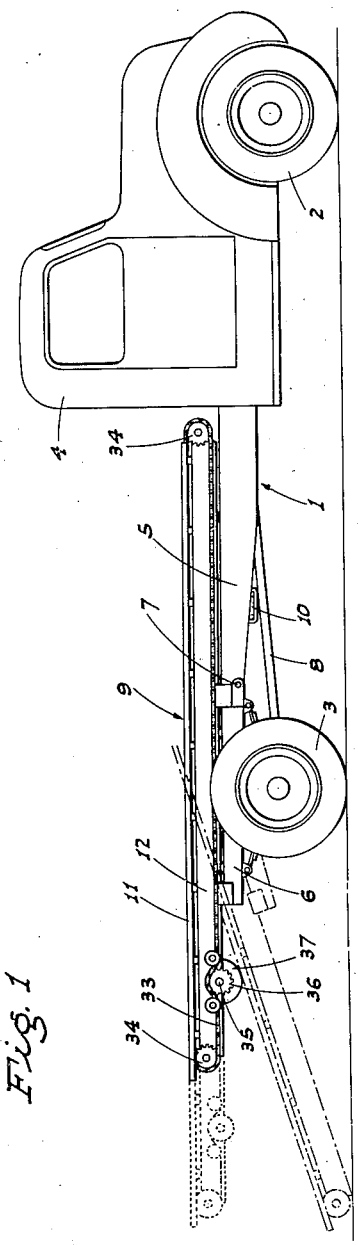
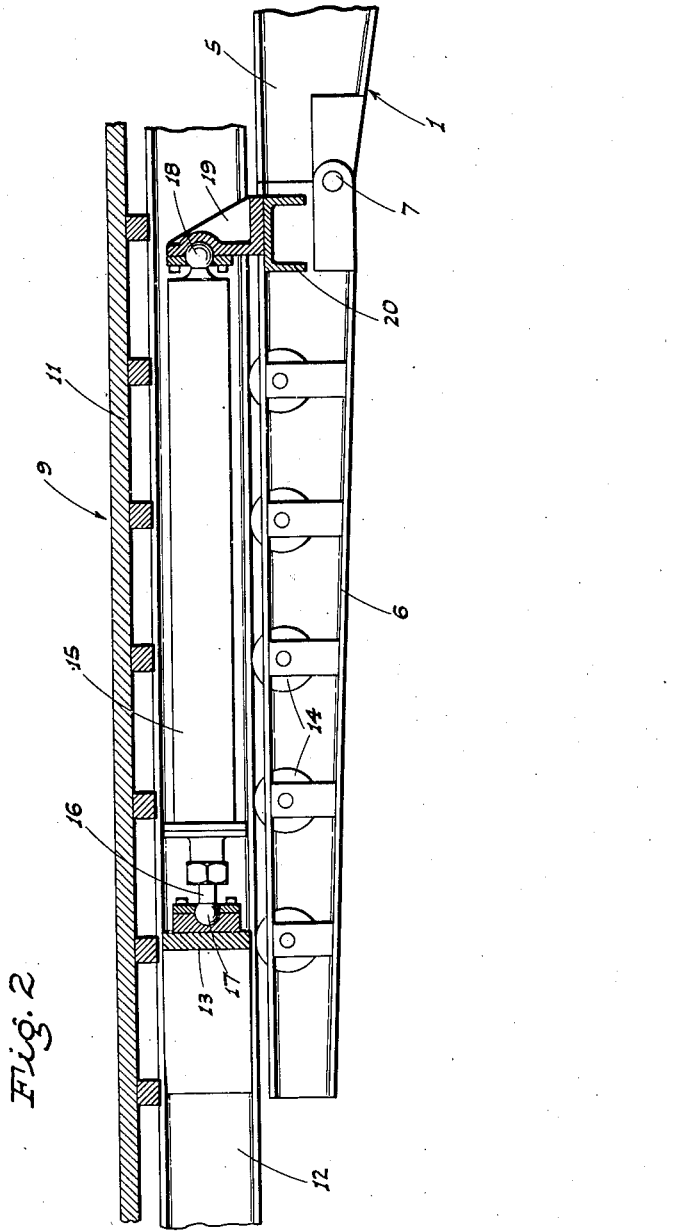
INVENTOR
*Edward Lisota*
BY *[signature]*
ATTORNEYS April 26, 1949.　　　　E. LISOTA　　　　2,468,502
ACTUATING DEVICE FOR SLIDING VEHICLE BEDS
Filed July 25, 1947　　　　　　　　　　　　2 Sheets-Sheet 2
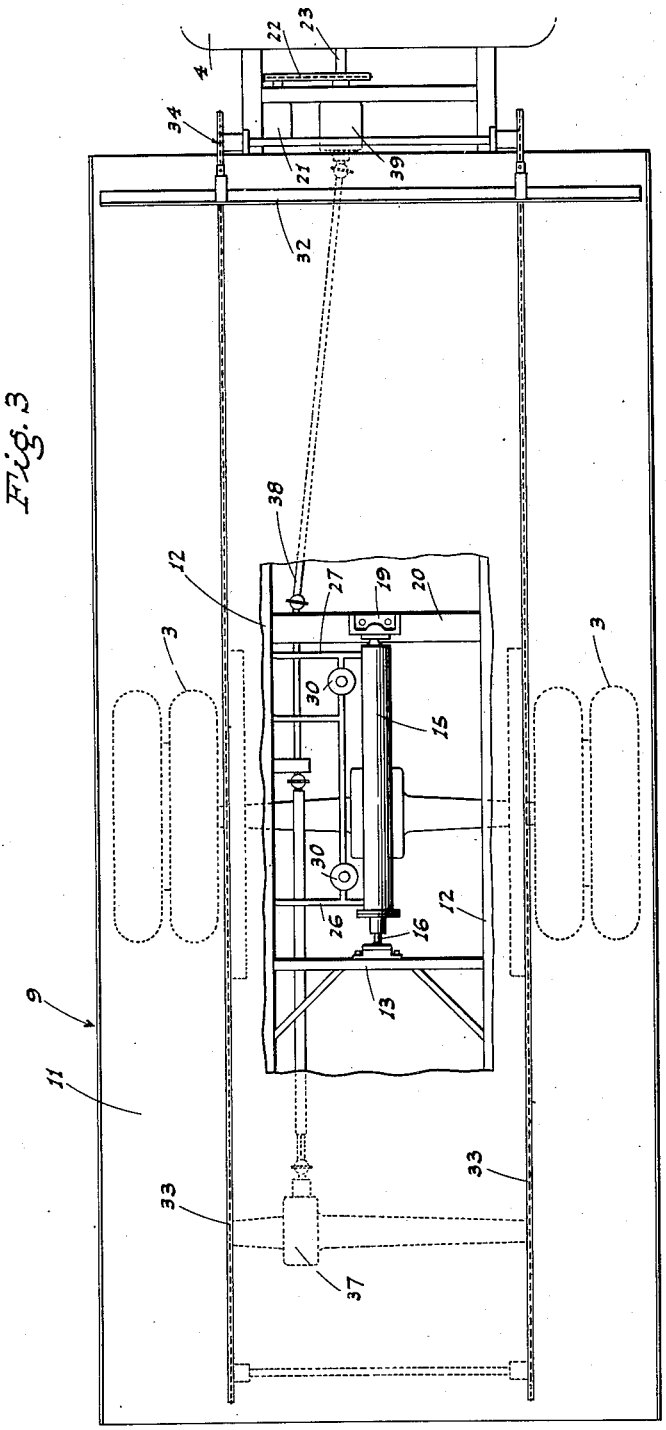
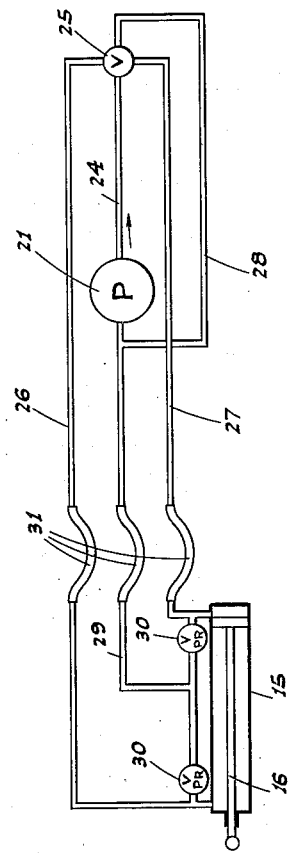
INVENTOR
Edward Lisota
ATTORNEYS Patented Apr. 26, 1949

2,468,502

UNITED STATES PATENT OFFICE 2,468,502

ACTUATING DEVICE FOR SLIDING VEHICLE BEDS

Edward Lisota, Patterson, Calif.

Application July 25, 1947, Serial No. 763,629

5 Claims. (Cl. 214—85)

This invention provides a novel actuating device for a sliding vehicle bed; i. e. a bed mounted on a vehicle for longitudinal sliding motion from an advanced transport position to rearwardly projecting loading or unloading position.

This present invention is a modification of the structure shown in copending application, Serial No. 742,351, filed April 18, 1947, now Patent No. 2,466,452 granted April 5, 1949, on Vehicle bed assembly. In such copending application, the longitudinally slidable bed is actuated by a mechanically driven screw and nut unit.

In the modified arrangement of the instant invention, the sliding bed is operated by a novel hydraulic system including a fluid pressure actuated power cylinder or ram, of double-acting type, coupled between the main frame of the vehicle and the sliding bed.

The invention further provides a unique relief valve arrangement which prevents damage to the working parts of the mechanism should the fluid pressure be held in the conduit system after the double-acting cylinder reaches either end of its stroke.

A further object of the invention is to provide a practical actuating device for a sliding vehicle bed, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of a truck embodying the present invention.

Fig. 2 is an enlarged fragmentary sectional elevation showing the vehicle bed actuating device as mounted for use.

Fig. 3 is a plan view of the device as mounted for use, with the vehicle bed assembly partly broken away.

Fig. 4 is a diagrammatic illustration of the valve-regulated fluid pressure control system.

Referring now more particularly to the characters of reference on the drawings, the invention is here shown in connection with a truck-type vehicle which includes a main frame, indicated generally at 1, supported by front wheels 2 and rear drive wheels 3.

Rearwardly of the cab 4 of the truck, the frame 1 comprises a rigid front section 5 and a separate rear section 6; the sections 5 and 6 being hinged or articulated, as at 7, for upward buckling movement from a normally horizontally alined transport position, as in full lines in Fig. 1.

The rear section 6 is supported by the rear wheels 3, and said wheels are driven by a universal drive shaft 8, which is splined to permit of the aforesaid upward buckling between the front and rear sections 5 and 6, respectively.

The rear section 6 supports a bed assembly, indicated generally at 9, intermediate the ends of the latter, in the manner hereinafter described in detail; the upward buckling of the sections 5 and 6 being for the purpose of inclining the bed assembly 9 downwardly into ground engagement for ease of loading or unloading.

Such articulated feature of the main frame 1 is dealt with in greater detail in said copending application, Serial No. 742,351, and wherein the tilting of the bed assembly to so incline it, with resultant buckling of the frame sections, is accomplished by mechanism such as is here shown in part at 10, preferably a hydraulic power cylinder connected in lift relation to the bed assembly 9 adjacent its forward end portion.

The bed assembly 9 is wholly supported from the rear section 6 of the main frame 1 by transversely spaced, longitudinal rows of rollers 14 on which the side beams 12 run; the bed assembly thus being mounted for longitudinal sliding motion from an advanced transport position to a rearwardly projecting loading or unloading position. Figure 1 shows, in dotted lines, the horizontal loading or unloading position of the bed assembly when it is projected rearwardly for cooperation with a platform, and said bed assembly, as shown in broken lines in such figure, may also be tilted downwardly, by articulation of the frame sections to permit of loading or unloading directly from the ground.

When the bed assembly 9 is in its forward or transport position, its center of gravity is consequently ahead of the rear wheels 3, so that there is no tendency of such bed assembly to tilt rearwardly by articulating the frame sections. However, if it is desired, a suitable releasable latching unit (not shown) may be used between the bed assembly and the main frame 1.

The following power mechanism is employed to slide the bed assembly lengthwise of the vehicle between the advanced transport position, and rearwardly projecting loading or unloading position:

A heavy-duty, double-acting power cylinder 15 of fluid pressure actuated type is disposed lengthwise of the vehicle centrally between the side beams 12 of the bed assembly and ahead of the cross beam 13. The power cylinder 15 includes a rearwardly projecting piston rod 16 coupled by a universal connection 17 with the cross beam 13. At its opposite end the power cylinder 15 is coupled by a universal connection 18 with an upstanding bracket 19 on a cross beam 20 of the main frame 1; said cross beam 20 being disposed adjacent the forward end of the rear section 6.

It will be seen that when the double-acting power cylinder 15 is contracted, the bed assembly 9 is in its forward transport position, while extension of the power cylinder 15 with projection of the piston rod 16 slides the bed assembly 9 rearwardly to its loading or unloading position, either horizontal for platform use, or tilted to ground engagement. As the power cylinder 15 swings with the rear section 6, the bed assembly can be shifted lengthwise regardless of whether it is horizontal or tilted. The universal connections 17 assure against any binding in the power cylinder assembly should there be any racking of the bed assembly 9 or rear section 6.

The valve regulated, fluid pressure control system employed in connection with the power cylinder is shown, diagrammatically, in Fig. 4. This system includes a pump 21 which is mounted in the main frame, and driven by an endless chain and sprocket unit 22 from the power take-off shaft 23 of the truck. A pressure conduit 24 feeds to a four-way valve 25 in the cab 4 within reach of the vehicle operator. This four-way valve is adapted to feed fluid pressure, selectively, to one feed conduit 26 or another feed conduit 27, or to a bypass conduit 28. The feed conduits 26 and 27 lead to opposite ends of the double-acting power cylinder 15; there being a return conduit 29 leading to the intake of the pump 21 and branched at the opposite end to connect with the conduits 26 and 27 adjacent said cylinder. Check valves 30 in the branched portion of the return conduit 29 are set to open toward the pump under predetermined pressure which is somewhat greater than that required for the power cylinder to actuate the bed assembly. Thus, as the power cylinder 15 reaches either end of its stroke and stops its motion, pressure which builds up in said cylinder can bypass through one or the other of the check valves 30 to the return conduit 29. This not only provides an automatic stop, but assures against any damage to the working parts should the pressure be maintained on the power cylinder at either end of its stroke.

The feed conduits 26 and 27, together with the return conduit 29, include flexible sections 31 therein, which sections extend across the axis of the hinge 7 between the frame sections 5 and 6.

In its normal position the valve 22 passes to conduit 28, which returns the hydraulic pressure to the return conduit 29. In other selective positions the valve 25 feeds conduit 26 or 27 to cause contraction or extension, respectively, of the power cylinder 15, with resultant forward or rearward sliding motion of the bed assembly 9.

Said bed assembly includes a power actuated unloading device which comprises a transverse load engaging bar 32 which runs on top of the bed 11; such transverse bar 32 being fixed to the upper runs of a pair of endless chains 33 which extend longitudinally of the bed assembly. The endless chains 33 run at opposite ends over sprocket units 34, and said chains are simultaneously driven by the following reversible arrangement:

A cross shaft 35 is journaled on the bed assembly, and at opposite ends carries drive sprockets 36 which mesh with and drive said endless chains 33.

Intermediate its ends, the cross shaft 35 extends through a gear box 37, and said gear box is driven by a universal drive shaft assembly 38 from a reduction and reversing gear box 39 on the main frame, and which box 39 is actuated from the power take-off shaft 23. The reduction and reversing gear box 39 is suitably regulated from the operator's cab by controls not here shown.

With the above arrangement the chains 33 can be actuated in one direction or the other to cause the bar 32 to shift rearwardly or forwardly on the bed 11, as may be required for loading or unloading the bed assembly.

From the foregoing description it will be readily seen that there has been produced such a device as substantially fulfills the objects of the invention, as set forth herein.

While this specification set forth in detail the present and preferred construction of the device, still in practice such deviations from such device may be resorted to as do not form a departure from the spirit of the invention, as defined by the appended claims.

Having thus described the invention, the following is claimed as new and useful, and upon which Letters Patent are desired:

1. A vehicle comprising a wheel-supported main frame, a bed assembly extending lengthwise of the main frame, means mounting the bed assembly on the main frame for sliding motion between an advanced horizontal position and a rearward position, and means operative to effect such sliding motion of the bed assembly; said means including a fluid pressure actuated power cylinder, a cross member on the main frame, a cross member on the bed assembly, said cross members being spaced lengthwise of the vehicle, a fluid pressure actuated power cylinder extending between said cross members, and a universal connection between each end of the power cylinder and the corresponding cross member.

2. A vehicle comprising a wheel-supported main frame, a bed assembly extending lengthwise of the main frame, means mounting the bed assembly on the main frame for sliding motion between an advanced horizontal position and a rearward position tilting downwardly toward the rear, and means operative to effect such sliding motion of the bed assembly; said means including a fluid pressure actuated power cylinder connected between the main frame and bed assembly, the portion of the main frame on which the bed assembly is mounted being articulated for tilting with the same, and the power cylinder connecting to said portion of the main frame so as to likewise tilt with the bed assembly.

3. A vehicle comprising a wheel-supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, a fluid pressure power cylinder extending lengthwise of the main section thereof, a cross member on the rear section adjacent one end of the power cylinder, another cross member on the bed assembly adjacent the opposite end of the power cylinder, and means connecting corresponding ends of the power cylinder to the cross members.

4. A vehicle comprising a wheel-supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, a fluid pressure power cylinder extending lengthwise of the main section thereof, a cross member on the rear section adjacent one end of the power cylinder, another cross member on the bed assembly adjacent the opposite end of the power cylinder, and means connecting the corresponding ends of the power cylinder to the cross members, said last named means including universal connections.

5. A vehicle comprising a wheel-supported main frame including a front section and a rear section pivoted together at adjacent ends for upward buckling from a substantially horizontally alined transport position, a bed assembly extending lengthwise of the main frame above the same, means mounting the bed assembly on the rear section of the main frame for sliding motion between an advanced horizontal position and a rearward position, the bed assembly including longitudinal, transversely spaced side beams and a cross beam connecting the same, a bracket upstanding from the rear section of the main frame ahead of the cross member, a fluid pressure actuated power cylinder disposed lengthwise between said side beams, and intermediate the cross member and bracket, and means connecting the power cylinder at corresponding ends to said cross member and bracket.

EDWARD LISOTA.

REFERENCES CITED

The following references are of record in the file of this patent:

UNITED STATES PATENTS

| Number | Name | Date |
| --- | --- | --- |
| 1,941,400 | Johnson | Dec. 26, 1933 |
| 2,047,875 | Kerzak | July 14, 1936 |
| 2,179,779 | Dempster | Nov. 14, 1939 |
| 2,251,435 | Anthony | Aug. 5, 1941 |
| 2,408,862 | Lisota | Oct. 8, 1946 |

FOREIGN PATENTS

| Number | Country | Date |
| --- | --- | --- |
| 472,467 | Great Britain | Sept. 23, 1937 |